Oct. 2, 1951    D. G. REMPEL    2,569,869
METHOD FOR MAKING HOLLOW ARTICLES
Filed April 19, 1949    3 Sheets-Sheet 1
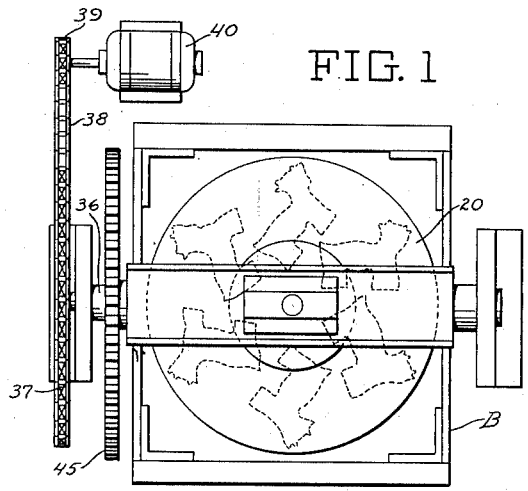
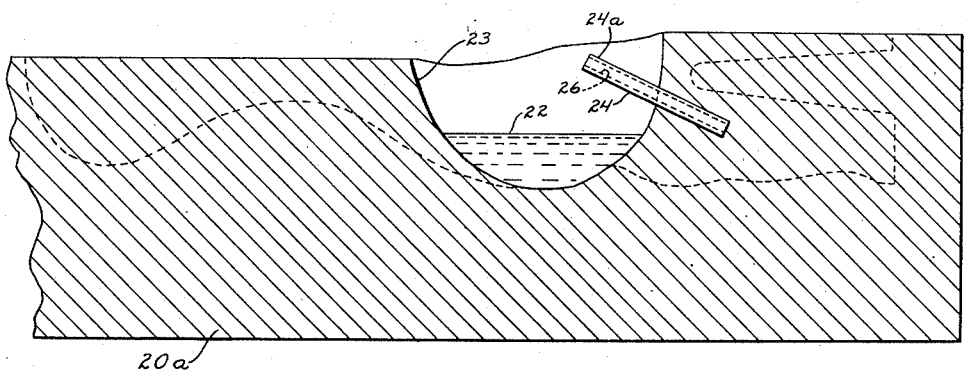
INVENTOR.
DIETRICH G. REMPEL
BY
William Cleland
Attorney Oct. 2, 1951   D. G. REMPEL   2,569,869
METHOD FOR MAKING HOLLOW ARTICLES
Filed April 19, 1949   3 Sheets-Sheet 2
FIG. 2
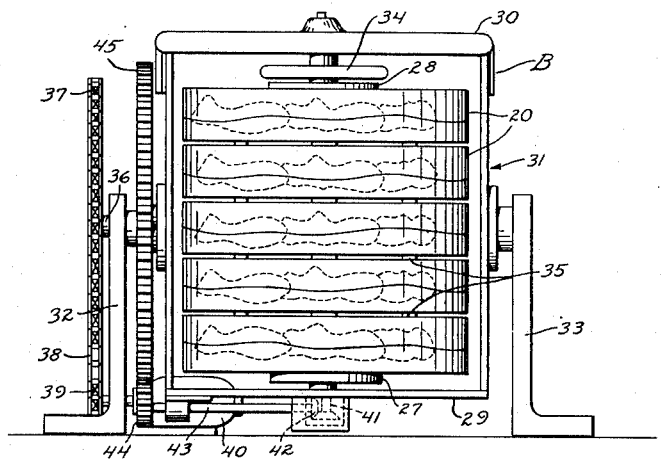
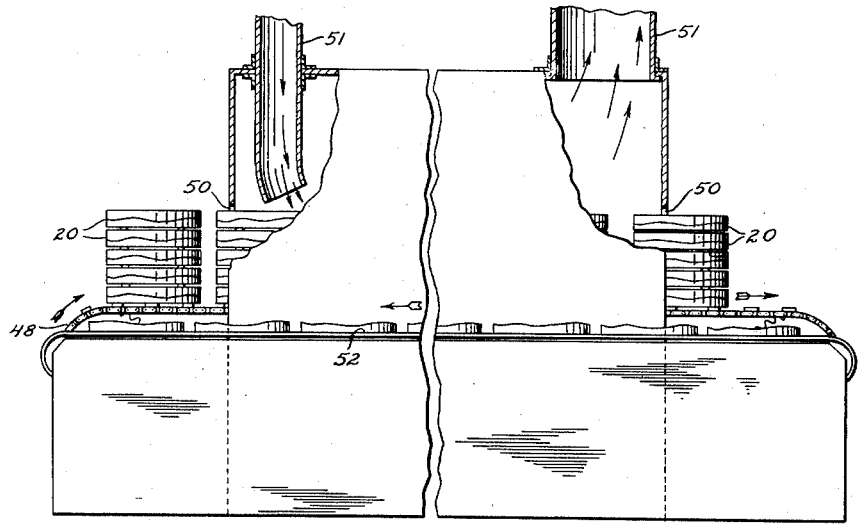
FIG. 3
INVENTOR.
DIETRICH G. REMPEL
BY
William Cleland
Attorney Oct. 2, 1951  D. G. REMPEL  2,569,869
METHOD FOR MAKING HOLLOW ARTICLES
Filed April 19, 1949  3 Sheets-Sheet 3
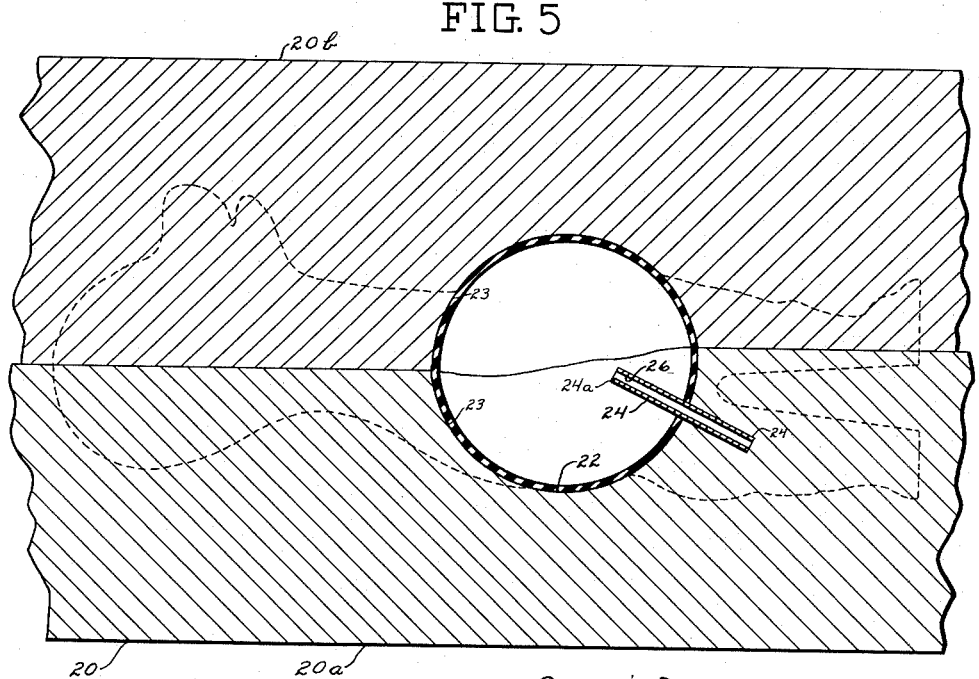
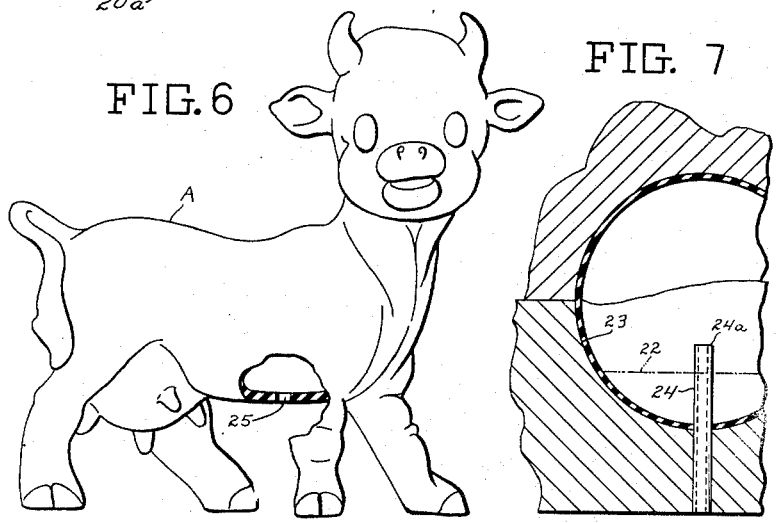
INVENTOR.
DIETRICH G. REMPEL
BY
William Cleland
Attorney Patented Oct. 2, 1951

2,569,869

UNITED STATES PATENT OFFICE 2,569,869

METHOD FOR MAKING HOLLOW ARTICLES

Dietrich G. Rempel, Akron, Ohio, assignor to Rempel Manufacturing, Inc., Akron, Ohio, a corporation of Ohio Application April 19, 1949, Serial No. 88,378

1 Claim. (Cl. 18—58.3)

This invention relates to a method for producing hollow articles, and particularly for producing hollow articles by deposition of liquid rubber or other aqueous dispersion material.

This application is a continuation in part of co-pending application Serial No. 773,209, filed September 10, 1947, now Patent No. 2,469,892.

The present invention in general utilizes the process of said co-pending application, by which a predetermined quantity of latex or similar aqueous dispersion material is placed in a plaster of Paris mold, which mold is given a compound rotary motion to deposit the latex on the mold cavity surface by capillary flow of water outwardly through the mold pores, and thereby to form a complete hollow article of substantially any desired shape and predetermined wall thickness, without excess deposition material. In actual large scale production of rubber articles utilizing this method, however, some articles upon being removed from the molds were found to have sagging or collapsed wall portions, caused by the air within the formed or forming articles being at a lower pressure than the air externally of the molds. In other words, after the rubber (latex) deposition process had started there was no way for air pressure in the mold cavity to become equalized with respect to the external air, by passage of air inwardly through the mold pores, and if a partial vacuum was formed in an article, collapsing of the wall thereof was likely to result. As a matter of fact, any such inward movement of air would be directly opposed to desirable continuously outward capillary movement of water from the latex, through the mold pores, to prevent such inward movement of trapped air which would be likely to form bubbles on the inner wall surface of the article or holes through the same.

An object of this invention is to provide an improved method by which air within the article-forming cavities of molds of the character described is substantially constantly maintained at a pressure substantially equal to that of the air exteriorly of the molds, whereby is eliminated the forementioned tendency of articles to collapse while still in the mold.

Another object of the invention is to provide an improved method for providing a whistle or other aperture in the articles during the steps of forming the same, and by which the last-mentioned object is efficiently and effectively attained.

These and other objects of the invention will be manifest from the following brief description and the accompanying drawings.

Of the accompanying drawings:

Figure 1 is a top plan view of a machine for applying compound rotary motion to a mold or molds.

Figure 2 is a front elevation of the machine shown in Figure 1.

Figure 3 is a side elevation, partly broken away and in section illustrating apparatus for conveying and treating the molds received from the machine of Figures 1 and 2.

Figure 4 is a fragmentary cross-section of a lower mold section, illustrating the step in the method prior to application of rotary motion thereto, wherein a predetermined volume of latex is placed in the mold cavity.

Figure 5 is a view similar to Figure 4, partly broken away, illustrating the completely formed articles in a closed mold, after it has been subjected to a compound rotary motion in the machine of Figures 1 and 2.

Figure 6 is an elevational view of a completed hollow rubber article, partly broken away and in section, after removal of the same from the mold of Figure 5.

Figure 7 is a fragmentary cross-section, similar to Figure 5, illustrating a mold having a modified form of aperture forming device therein.

The improved method may be best described in connection with the operation and use of equipment illustrated in certain figures of the drawings.

As a preliminary step in carrying out the method of the present invention to produce the hollow rubber character animals A shown in Figure 6, for example, the lower section 20a of a two-part cavity mold 20, of plaster of Paris, clay, or like porous material, is suitably mounted in horizontal position. In this horizontal position of section 20a a predetermined volume 22 of rubber latex is supplied to each of a plurality of article-forming cavities 23, 23 therein, as illustrated in Figure 4, and then the upper mold section 20b is placed upon the lower section with the corresponding cavity portions in registry as shown in Figure 5.

Each cavity 23 may have at least one stem 24 of non-porous material projecting freely inwardly from the surface thereof, in proper position as for providing a whistle aperture 25 in the wall of the article in a manner to be described later. The stem 24 may comprise a hollow tube of hard synthetic resin, wax paper, glass, or other waterproof non-porous material, the outside diameter of which corresponds to the desired diameter of the required aperture 25, and it may be snugly received in an aperture which extends part way into the mold wall, as shown in Figures 4 and 5, or all the way through the mold wall as shown in Figure 7. In either instance, the freely projecting end portion 24a of the stem is of substantial length and positioned at a suitable angle so that in all positions of possible rotation of the closed mold (Figure 5) the inner end of the stem will always be above the surface of the latex. The passage 26 through the stem, therefore, is effective to equalize the air pressure interiorly of the mold with respect to the exterior thereof, whether the stem extends part way or completely through the mold wall, as described.

Immediately after filling and closing a plurality of molds 20, in the manner set forth, the same may be placed in suitable mold-rotating machines. One such mold-rotating machine is illustrated as containing five such molds, the same being stacked between spaced end plates 27 and 28, coaxially rotatably mounted on spaced cross-pieces 29 and 30 of a rectangular frame 31, which is in turn supported on spaced brackets 32 and 33 to rotate about a horizontal axis at right angles to the axis of rotation of the plates 27 and 28. The cross-piece 30 may be releasably shiftable outwardly of the frame, by suitable means as shown or otherwise, to permit such stacking or removal of molds from the frame. A suitable device 34 is provided in association with plate 28 to apply clamping action thereto for holding the molds tightly together. Adjacent molds of the stacks thereof may have small spacers 35, 35 therebetween to permit substantially free circulation of air around each mold, as will be described later, and to facilitate handling of the separate molds. For rotating the mold supporting frame 31 about its horizontal axis, a relatively fixed shaft extension 36 therefrom has a large sprocket 37 keyed thereto to be driven, through a chain 38 and smaller sprocket 39, by a suitable motor 40. To the end that the stacked molds 20, together with the discs 28 and 29, may be rotated about an axis angularly of said horizontal axis, a shaft extension 41 from disc 27 has a bevel gear connection 42 with a shaft 43 carried by the frame 31, and a spur gear 44 on a free end of the shaft 43 engages a fixed relatively larger gear 45 secured to the fixed support 32. This arrangement is such that as the motor 40 drives sprocket 37 to rotate the frame 31 about the horizontal axis thereof, this rotational movement of the frame carries spur gear 44 around fixed gear 45, said gear 44 thereby being driven to rotate shaft 43, and through bevel gears 42 applying rotary motion to the molds about an axis at right angles to the axis of rotation of the frame 31. The compound rotary motion thus attained in machine B is relatively slow, as for example, approximately one revolution per minute about each of the two axes, preferably with a slight differential in the speeds about the respective axes to assure complete uniform latex coverage of all cavity surface areas. Highly satisfactory results have been attained by rotating the mold one revolution per minute about one axis and one and one-quarter revolutions per minute about the other axis, or otherwise in accordance with particular conditions or requirements. The compound rotary action provided by the machine B is effective to deposit the latex of body 22 about the interior of the mold cavities, and thereby forming complete hollow articles A of predetermined uniform wall thickness (see Figures 5 and 6).

It is highly desirable that there be a short lapse of time, say one and one-half minutes, between supplying of the latex to the molds and initial complete coverage of the article-forming surface portions of each mold cavity.

The time required to complete the compound rotational step may vary according to conditions, such as differences in the characteristics of the deposition material, desired thickness and size of the completed article, etc., but in actual full scale production of rubber toys of one type (see Figure 6) by the present method it has been found that latex deposition to full thickness may be accomplished in approximately forty-five minutes.

It has been found also that in forming hollow rubber articles in particular, the setting or drying action of the latex on the mold cavity surface is relatively rapid during the initial compound rotational movements of the mold, and that as the rotational movement is continued the rate of speed of the setting or drying action becomes slower and slower until it levels off to a constant relatively slow setting action.

After the compound rotary action has been completed, machine A is stopped and the stack of molds is removed therefrom and placed on an intermittently operable conveyor 48, shown in Figure 3. Conveyor 48 is in the nature of a progressively movable storage space, the same being operable to move mold stacks from one end of the conveyor to the other within a substantial period of time during which articles A in the respective molds, will by continued capillary removal of moisture from the deposited rubber through the pores of the molds, dry or set sufficiently to permit opening of the molds and ready removal of the articles therefrom without damage, at the leading end of conveyor 48 (see arrows in Figure 3). This step in the process, termed the pre-drying stage, may take about eight hours. In other words, when each article is fully formed, by deposition or accretion of latex within its mold cavity, and is ready for removal from the molds, substantially all water from the initial predetermined quantity of latex 22 will have passed outwardly of the mold cavity by capillary attraction, through a myriad of pores in the mold material, the water being dissipated at the outer mold surfaces by evaporation. This substantially complete removal of water from the deposited latex (see Figure 5), together with the above referred to adhesion of the formed article to the mold cavity surface, no doubt accounts for the subsequent slight shrinkage which has been found to be substantially the same as the normal shrinkage of molded rubber articles made by "blowing" methods (about two per cent).

When the latex is deposited on the mold cavity surfaces, as described above, there will be little or no latex deposited on the non-porous stems 24 (see Figure 5), and hence when each completed article A is removed from its mold the stem or insert 24 will have formed a substantially perfect aperture 25 through the wall of the article. The aperture 25 serves a dual purpose, first to provide a vent for heated air within the article when it is exposed to subsequent heat of vulcanization and thereby prevents bursting of the same due to internal expansion of the air therein, and second, to provide means for insertion of a wind-operated whistle device (not shown) of known type in the finished article.

In connection with the pre-drying stage of the method it has been found that damaged goods may be caused by formation of air bubbles, particularly during the latex deposition stage or stages. In actual practice such conditions will be obviated if the capillary movement of water from the deposited latex is maintained continuously outward through the mold, from the cavity thereof, at all times while the deposited latex is in the molds. To this end, there may be provided over and around the conveyor 48, a heat-insulated hood or housing 49, having suitable openings 50 at opposite ends thereof to permit passage of the stacks of molds carried by the conveyor. Heated air is blown from a suitable source (not shown), through conduits 51, 51, to the interior of housing 49 and outwardly through a conduit 52, thereby circulating the air around the stacks of porous molds. A suitable temperature for the air for the present purposes is approximately 90° F. A temperature approximating 120° F. or over may cause expansion from within the completely formed hollow articles, which would force the molds open and thereby damage the articles. This moderately heated air, then, in circulating around the molds, including the spaces between adjacent molds as provided by spacers 35, all during the pre-drying stage, will maintain the molds relatively dryer on the outside than on the inside (from the cavity surfaces), and as long as there is water in the latex deposits such water will be steadily dissipated outwardly by capillary attraction and evaporation and no wet layers or strata will be created to cause formation of recesses and holes in the articles, as previously described. This treatment of the molds, of course, is important for preparing the same for each succeeding article-forming cycle, because the mold will then have no localized water-saturated areas creating air pockets outwardly of the cavity surfaces, and when succeeding latex supplies are placed in the molds the molds will again be desirably wetter inside than out and the capillary movement of the water will be maintained continuously or at least consistently outwardly as long as there is water in the latex or latex deposits.

After the molds have been on conveyor 48 the requisite length of time, as set forth above, they are removed and opened by suitable means (not shown) and the full-formed articles are removed therefrom, the mold halves being returned to the latex dispensing station, on conveyors 53. The removed articles A may be placed on suitable racks, which are then placed in a drying or vulcanizing chamber or oven at sufficiently high temperature to complete the curing cycle.

The internal structure of the porous mold may be considered as cellular and comprising interconnecting miscroscopic tubes or passages which carry water by capillary attraction from the cavity surfaces to the outer surfaces of the mold. Any condition of the mold in which the mold cavity surface is maintained wet and water in these tubes or passages extends continuously from the cavity surfaces, that is with no air-trapping pockets between said inner and outer mold surfaces, will result in the water or moisture from the deposition material or deposited article being continuously dissipated outwardly of the mold cavity by capillary attraction and evaporation, without creating air bubbles resulting in defective goods. In order that there will be no interruption in this continuous outward capillary movement of the water, which would create an adverse condition as previously described, it is important to maintain at a minimum the period between the opening of each mold at the delivery end of conveyor 48, for removal of the articles therefrom, and refilling and closing the mold at the latex dispensing station. In continuous operation of the process, utilizing return conveyor 53, when this period was maintained at approximately five minutes satisfactory articles were produced.

Character animals or other hollow articles produced by the herein described method will have substantially uniform wall thickness throughout. Moreover, by use of the hollow stems or inserts 24 the air pressure within the articles being formed during the deposition step, that is while the molds are provided with compound rotative movement in mold-rotating machine B, the air pressure within the articles is constantly maintained substantially equal to the air pressure externally of the molds thereof. Thus any tendency for the articles to collapse due to reduced pressure within the articles during the latex deposition stage is completely obviated. Stems 24 or protuberances of various shapes may be provided in the mold cavities for other purposes, and with passages through the same for equalizing the air pressure between the interior and exterior of the molds, as described above.

It will be seen from the above described angular velocities of the molds about angularly disposed axes (approximately one revolution per minute) and the length of time required to complete the deposition process (forty-five minutes, more or less depending upon conditions), that approximately forty successive compound rotations of the molds will progressively apply a corresponding number of latex laminations, layer-upon-layer in each mold cavity, conforming accurately to the shape thereof. That is, each article A is built up of a series of laminations produced by layering latex solution onto the mold cavity surface with said compound rotations. Because the unused latex retains all of its water until deposition or accretion thereof takes place, it flows freely during the continued compound rotations of the molds and conforms accurately to the shape of every part of each mold cavity, including undercut portions of reentrants, sharp corners, and even such small parts as the ears, horns, tail, teats, etc. of the cow shown in Figure 6, will be hollow and of substantially uniform wall thickness as compared with the other parts of the article. When all of the latex 25 has been used up and the above-described self-curing procedure of the article in the mold has been completed, substantially all of the water will have been removed from the deposited latex. Upon removal of the article from the mold, therefore, it will be of substantially the same size and configuration as the mold cavity. If any shrinkage takes place with further vulcanization of the article (at room temperatures or otherwise), such shrinkage will be no more than the normal shrinkage of rubber during a similar vulcanization cycle by other methods (about two percent). The completed articles are seamless, as distinguished from articles made from preformed plural part "biscuits" of sheet rubber in the use of "blowing" methods.

Although the improved process has been described particularly in connection with the production of hollow rubber character animals, it may be similarly employed for producing other hollow articles such as rubber balls, athletic ball bladders, mechanical goods, etc.

Similarly, the improved process may be successfully employed in the production of articles other than rubber, when the material thereof is adapted to be supplied as an aqueous solution and lends itself to setting through dehydration by capillary attraction in a porous mold.

Modifications of the invention may be resorted to without departing from the spirit thereof or the scope of the appended claim.

What is claimed is:

A method of making hollow articles comprising the steps of providing a sectional porous mold having an article-forming cavity adapted to contain a liquid in all positions of rotation and having a non-porous element affixed to a mold cavity surface portion to protrude inwardly thereof, said protuberance having a passage therethrough communicating the mold cavity with the mold exterior through the wall of the mold, placing in said article-forming cavity a predetermined quantity of rubber aqueous dispersion material capable of setting by removal of the water therefrom, and thereafter applying to the mold a series of compound rotary motions about a plurality of angularly disposed axes to deposit said predetermined quantity of the solution over the surfaces of the mold cavity in diverse directions of flow of the dispersion material, whereby said deposition and accretion is accomplished by removing water from the dispersion material by capillary attraction outwardly through the mold pores and evaporation at the outer mold surface portions, said protuberance being maintained with the inner end of said passage above the liquid level at all times during deposition of the article, said deposition of dispersion material by being substantially ineffective as to said non-porous inwardly presented portion of said protuberance thereby providing a corresponding void in the wall of the article.

DIETRICH G. REMPEL.

REFERENCES CITED

The following references are of record in the file of this patent:

UNITED STATES PATENTS

| Number | Name | Date |
|---|---|---|
| 1,564,274 | Rand | Dec. 8, 1925 |
| 2,042,975 | West | June 2, 1936 |
| 2,468,760 | Kempthorn | May 3, 1949 |
| 2,469,892 | Rempel | May 10, 1949 |

FOREIGN PATENTS

| Number | Country | Date |
|---|---|---|
| 1,308 | Great Britain | June 7, 1855 |